A. H. FETZER.
COMPENSATING TRANSMISSION GEARING AND AXLE CONSTRUCTION.
APPLICATION FILED APR. 16, 1913.
1,128,429.
Patented Feb. 16, 1915.
3 SHEETS—SHEET 1.
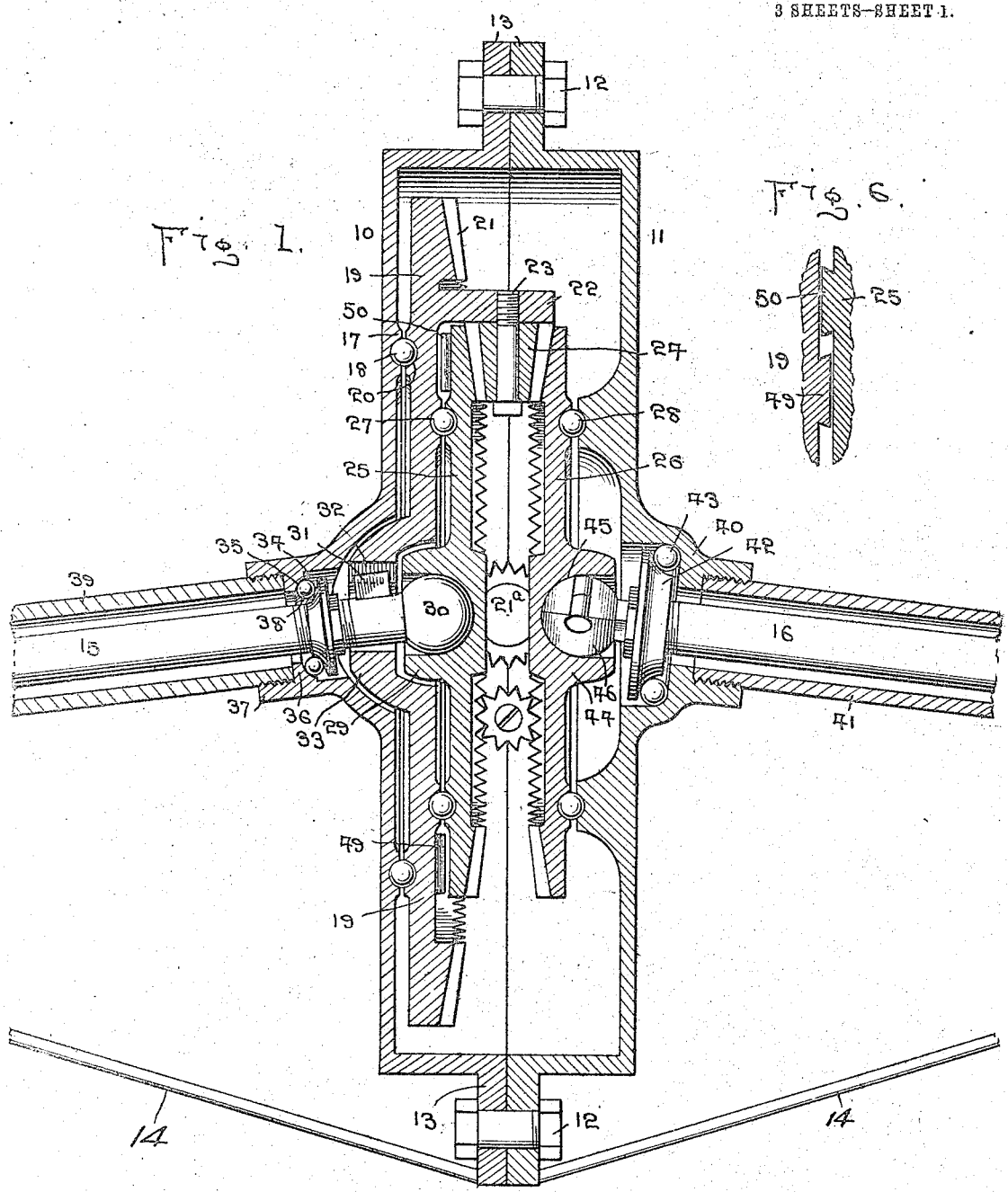
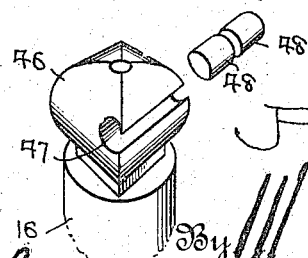

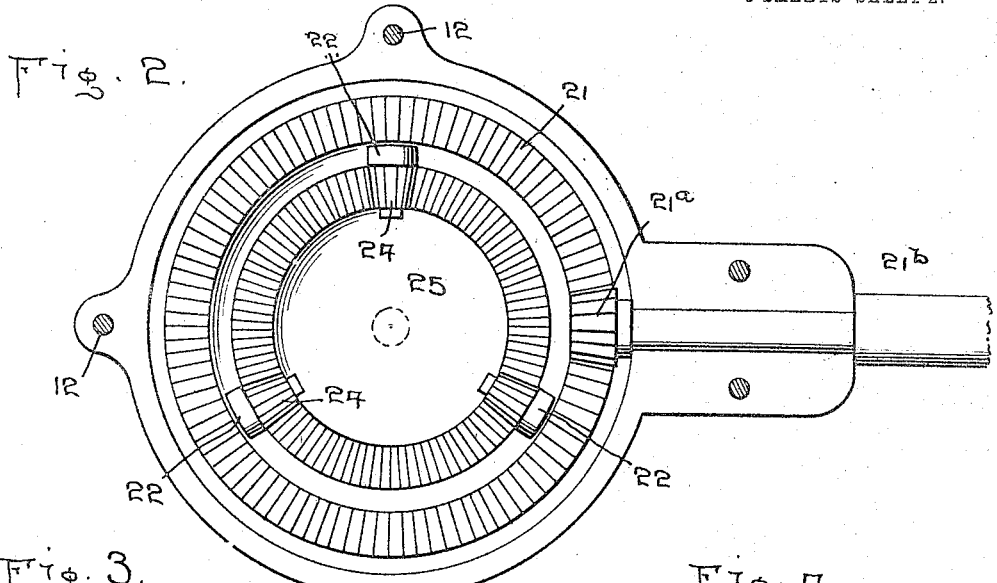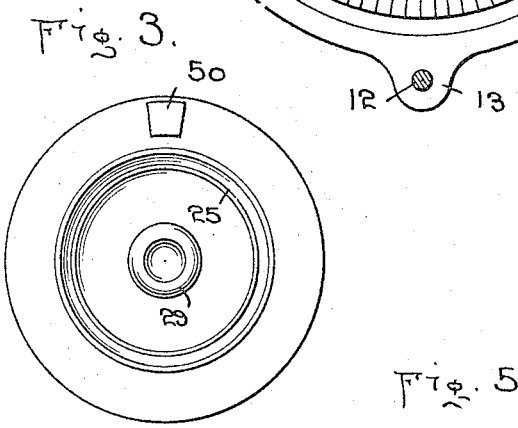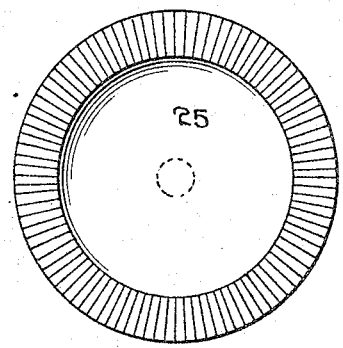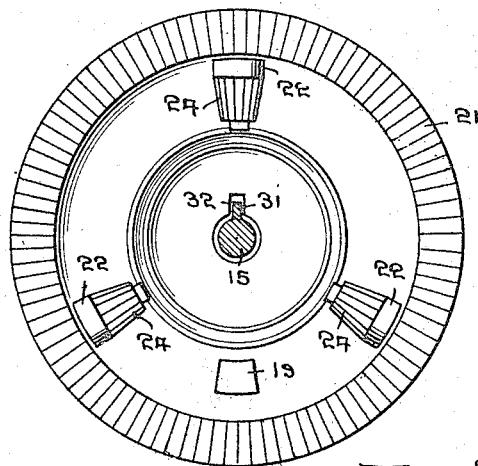

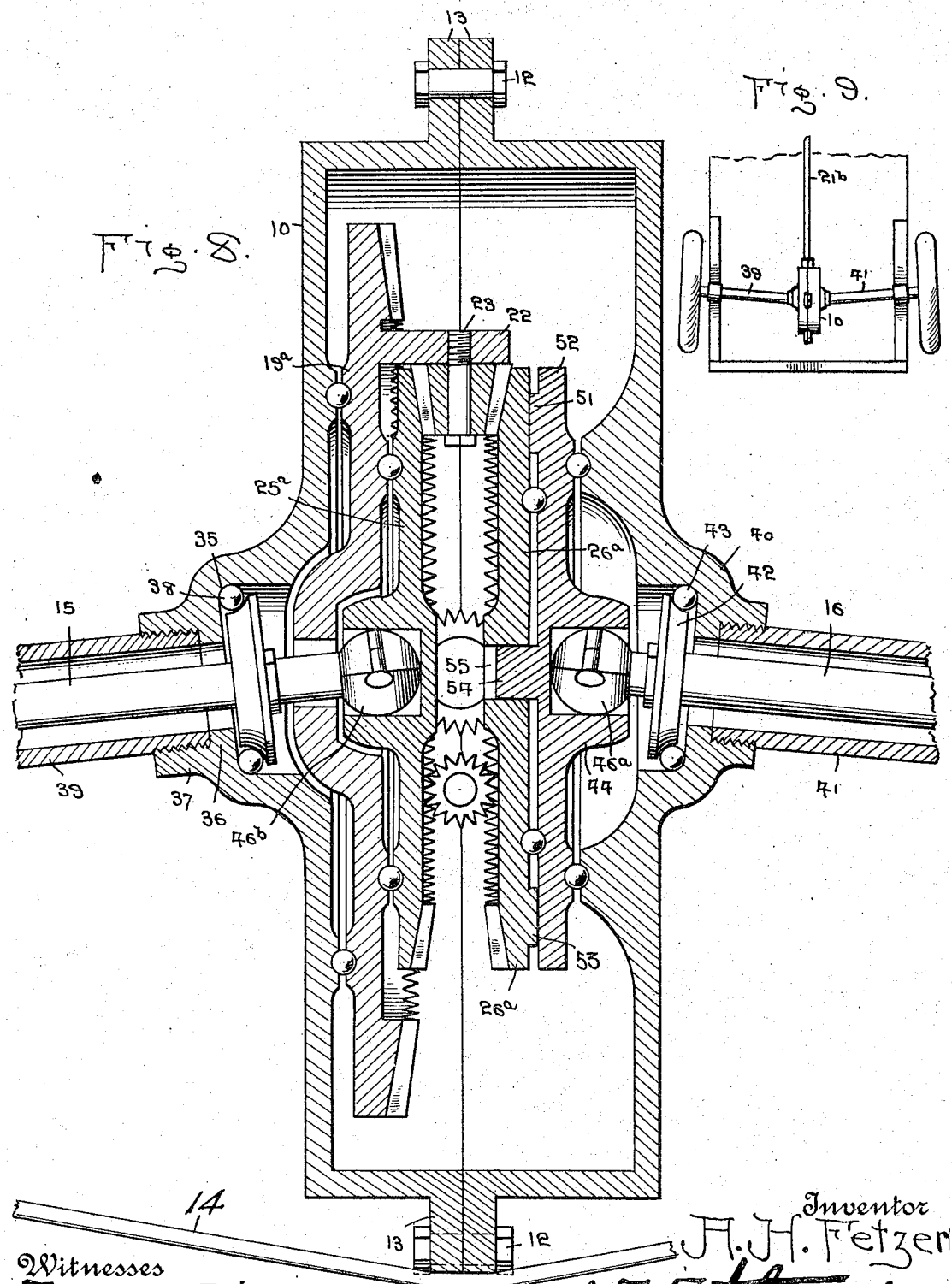

UNITED STATES PATENT OFFICE.

ALLEN H. FETZER, OF GALION, OHIO.

COMPENSATING TRANSMISSION-GEARING AND AXLE CONSTRUCTION.

1,128,429.  Specification of Letters Patent.  Patented Feb. 16, 1915.

Application filed April 16, 1913.  Serial No. 761,437.

*To all whom it may concern:*

Be it known that I, ALLEN H. FETZER, a citizen of the United States, residing at Galion, in the county of Crawford and State of Ohio, have invented certain new and useful Improvements in Compensating Transmission - Gearing and Axle Construction; and I do hereby declare the following to be a full, clear, and exact description of the invention, such as will enable others skilled in the art to which it appertains to make and use the same.

My invention relates to transmission gearing for automobiles or other motor driven vehicles and it has for its principal object to provide such gearing with improved means for compensating for the tendency of the axles to spring downward when the load is placed upon the machine.

Another object of the invention is to provide an improved universal joint generally applicable but specially applicable to gearing constructed in accordance with this invention.

Another object of the invention is to generally improve the construction and operation of compensating gearing of the class specified with a view to economy of construction and easy and smooth operation.

With these objects in view the invention consists in the improved construction, arrangement and combination of parts hereinafter fully described and afterward specifically claimed.

In order that the construction and operation thereof may be readily comprehended, I will now proceed to fully describe the invention, in connection with the accompanying drawings, which illustrate an approved embodiment of the invention; and in which, Figure 1 represents a sectional view taken on a vertical plane cutting through the gear casing, some of the parts being shown in elevation. Fig. 2 represents in interior view in elevation of one half of the casing and its contained parts, the other half being removed. Fig. 3 represents a view in rear elevation of the idler wheel. Fig. 4 represents a view in front elevation of the same. Fig. 5 represents a view in elevation of the front face of the driving gear, the shaft being shown in transverse section. Fig. 6 represents in section enlarged fragments of the driving gear and the idler. Fig. 7 represents in perspective view my improved axle head forming part of the universal joint thereof with the gearing, the anti-friction rollers being shown separated from the head. Fig. 8 represents a modified form of the general mechanism. Fig. 9 represents diagrammatically, in plan view, the position of the wheels relative to the axles, when about to start the machine.

Like reference characters designate the same parts wherever they occur in more than one of the figures of the drawings.

Referring specifically to the drawings, 10 and 11 indicate the two halves of a gear casing, of ordinary construction, except as hereinafter specified, said parts 10 and 11 being adapted to be secured together by ordinary bolts 12 passing through usual flanges 13. The casing may be supported in the usual manner on the machine and will ordinarily be upheld by braces, such as 14, passing under the flanges 13, at the lower side of the casing.

Suitable provision is made in shaping the casing, for mounting the axles 15 and 16, and a sun and planet bevel gearing, one-half 17 of a ball race being provided on the inner surface of the part 10 to receive balls 18 against which is placed a main gear wheel 19, having a corresponding half 20 of the ball race formed opposite the half 17 referred to. The main gear wheel 19 is provided on its inner side, beginning at the periphery, with bevel gear teeth 21 which engage the usual bevel gear 21ª on the driving shaft 21ᵇ (Fig. 2), whereby said gear wheel 19 becomes the driving gear. This driving gear carries a suitable number of lugs or brackets 22, in this instance three being shown, each of which is threaded to receive a radial stub shaft 23 projecting toward the center of the wheel, upon which stub shafts are loosely mounted planet bevel pinions 24 which are continuously in mesh with an idler bevel gear 25 and a driver bevel gear 26, on opposite sides of planet pinions, ball races being provided between the main driving gear 19 and the idler gear 25 to accommodate balls 27 and between the driving gear 26 and the casing 11 to accommodate balls 28.

The idler wheel 25 is provided with a hub 29 which is hollowed out to form a socket for a ball 30 on the inner end of the axle 15, said axle being also provided with a key 31 which engages loosely, with considerable play, in a groove or key way 32 in the hub 33 of the main driving wheel 21.

The axle 15 is provided with a cone 34 which with a similar cone 35 on an inwardly projecting annular collar 36 in a tubular projection 37 from the casing 10, forms a race for balls 38. The axle 15 is also surrounded by the usual axle tube 39 threaded into the tubular projection 37.

A tubular projection 40 is provided on the part 11 of the casing into which the axle tube 41 is threaded, which contains the axle 16, said axle 16 being provided with a cone 42 which with the interior of the tubular projection 40 forms a race for balls 43, forming the bearing to facilitate the rotation of the axle 16. While I might mount the axle 16 in a socket formed in the hub 44 of the driving wheel 26, in the same manner as the axle 15 is mounted in the hub 29 of the idler 25, I prefer to and have illustrated said socket 45 as of rectangular form on a plane passing through it parallel with the wheel, in order to receive an improved form of ball shown at 46 in Figs. 1 and 7, said ball, on a plane transversely through it at right angles to the axle, being rectangular in cross section, while in planes passing through it longitudinally of the axle it will be of curved outline. Transversely of the ball at about its middle, is formed a nearly cylindrical seat 47 for two rollers 48, said seat being open sufficiently to permit the rollers to project slightly therefrom and to contact with the interior of the walls of the socket 45. It will be observed that the tubular projections 37 and 40, which determine the direction of the axle tubes 39 and 41 and the axles 15 and 16 with relation to the casing, are considerably inclined from a horizontal plane passing through the casing at right angles. This inclination is somewhat exaggerated in the drawing in order to make it more prominent, the usual inclination in practice being about two and one-half degrees from said transverse horizontal plane.

The arrangement of the parts as hereinbefore described, is such that when the load is brought upon the machine, the relative positions of the gear casing and the wheels will be so changed as to overcome this slight inclination and bring the axles 15 and 16 into an exact horizontal line, whereby the tires of the wheels will squarely contact with the roadway and there will be no angular rubbing strain of any of the parts which would occur if the axles were normally set in exact horizontal lines and the placing of the load upon the machine would cause them to be inclined a similar amount upward from the machine, whereby, when the machine was in operation, the upper edge of the wheels would be inclined inward and all rubbing joints would be subjected to an angular strain which would tend to extraordinary wear and to quick heating and other damage. This correction of the angles of the axles with relation to the gear casing is permitted by the construction hereinbefore described, wherein slight play is permitted in the joints especially in those joints between the gears 19 and 26 and the axle.

In Fig. 8 I have shown a slightly modified construction of the general construction which differs from that shown in Fig. 1 in that the key 31 is omitted and the ball joint at 30 in Fig. 1, is changed to the form indicated at 46ª and 46ᵇ in said Fig. 1. The driver or main gear 19ª of Fig. 1 becomes in the construction of Fig. 8, simply a bearer or support for the brackets 22 which carry the bevel planet gears or pinions 24, the lugs 49 and 50 on the main gear and the idler 25 of Fig. 1 being omitted. In the construction of Fig. 8, the gear 26ª corresponding with gear 26 of Fig. 1, becomes an idler instead of the gear 25 in Fig. 1, except when lugs 51 on the disk 52 of Fig. 8 are in contact with lugs 53, in the same manner as described in connection with Fig. 1, when said gear 26ª becomes the driving gear, it being connected to the disk 52 by said lugs 51 and 53. The disk 52 is connected with the axle 16 by the driving ball joint 46ª. The disk 52 in Fig. 8, is provided with a central stem 54, circular in cross section, which is journaled in a central recess 55 in the gear 26ª.

While I have specifically described the construction and arrangement of the various elements comprehended in my invention, it will be obvious to those skilled in the art that many slight changes and variations might be made in their construction and relative arrangement, without departing from the spirit and scope of the invention.

What I claim is:—

1. Transmission gearing comprising; oppositely disposed axles, each having a ball head upon the inner end thereof, said ball heads having sides, said sides forming approximately convex cylindrical surfaces, giving circular edges right angularly disposed toward each other, said head having a transverse cylindrical opening across one of said sides, a plurality of friction rollers mounted in said opening and projecting beyond the plane of said side, and planetary gearing seating and connecting in operative position said ball heads.

2. Transmission gearing for automobiles comprising; angular and oppositely disposed axles, antifrictional bearings therefor, a universal joint connection at the inner end of each of said axles, said joint connections comprising; ball heads having approximately cylindrically shaped convex sides, and a cylindrical recess transversely cut into one side of each of said ball heads, a plurality of frictional rollers mounted in said recesses and projecting beyond the plane of each of said sides, socket devices seating each of said ball heads, one side of which, bears against said frictional rollers, and planetary gearing connecting said devices in operative relation.

3. A transmission device for automobiles comprising a planetary gearing device adapted to give compensation movement having socketed seats for universal joints centrally disposed in said planetary gearing, said seats being square in outline, oppositely disposed axles having a ball head seated in each of said seats, said ball heads having oppositely disposed sides which are longitudinally curved to give a convex surface thereto, said ball heads also having a transverse recess cut into one of said sides, and a plurality of rollers mounted in said recess and projecting beyond the plane of said side, to contact with one surface of said seats.

In testimony whereof I have signed my name to this specification in the presence of two subscribing witnesses.

ALLEN H. FETZER.

Witnesses:
  C. E. FETZER,
  BERTHA GOLDBERG.